C. H. MELVIN & A. S. ENTERLINE.
RAIL JOINT.
APPLICATION FILED OCT. 17, 1912.
1,059,189.
Patented Apr. 15, 1913.
2 SHEETS—SHEET 1.
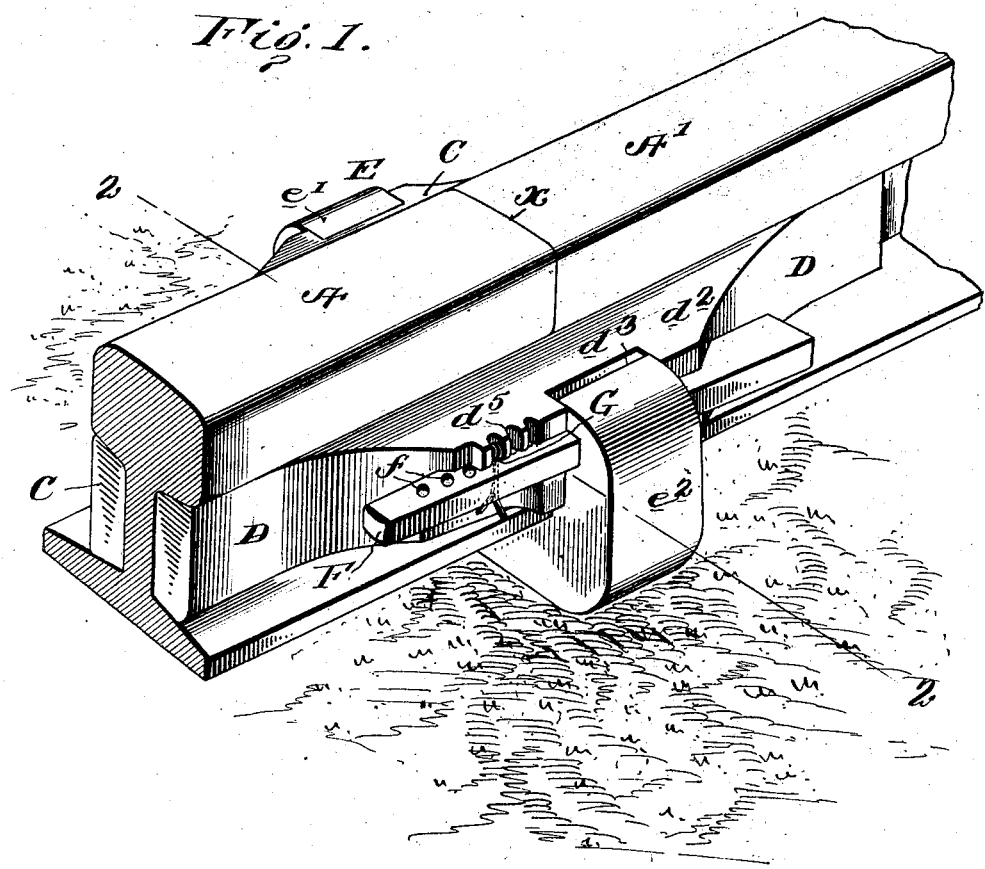
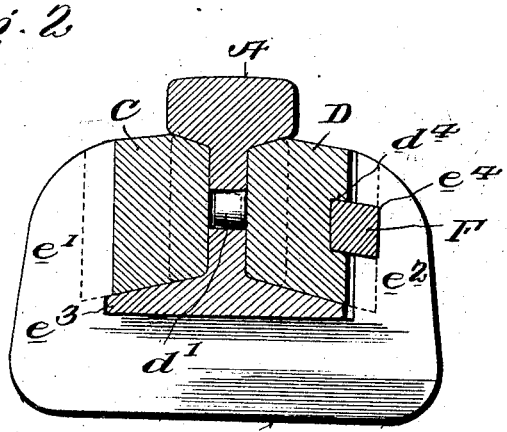
Inventors
Charles H. Melvin
Austin S. Enterline
by their Attorneys,

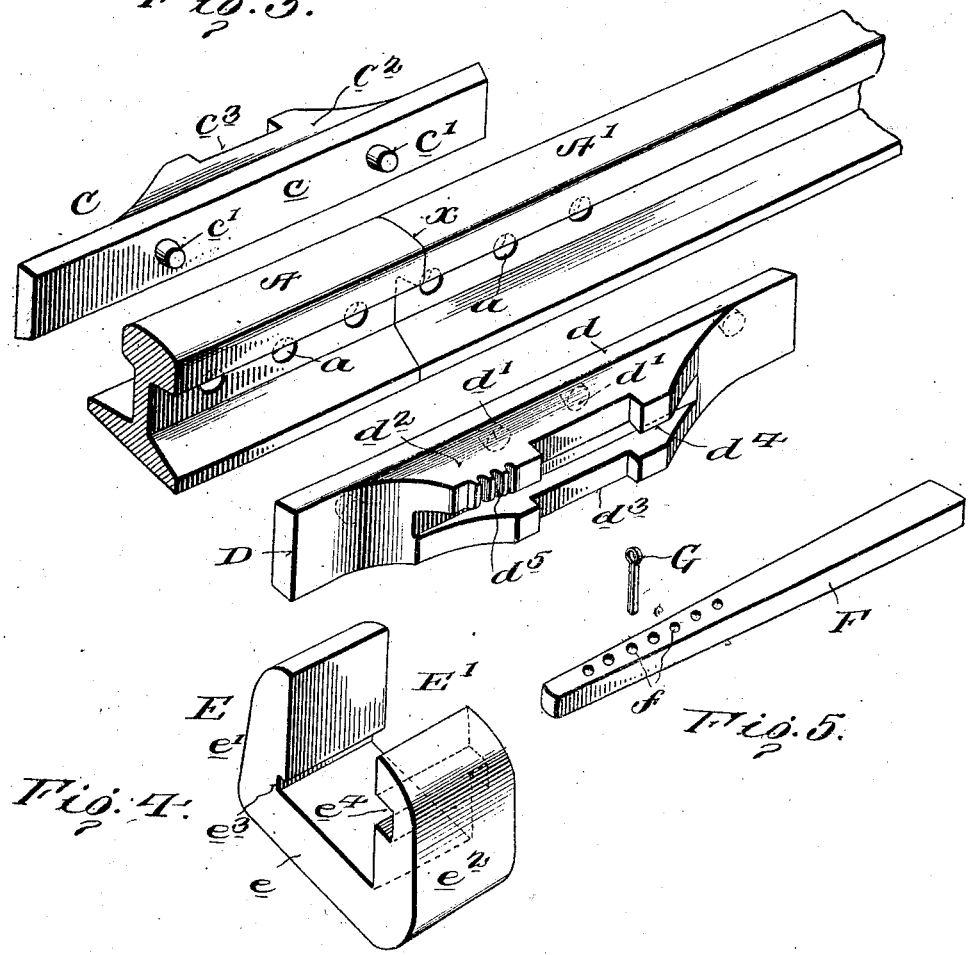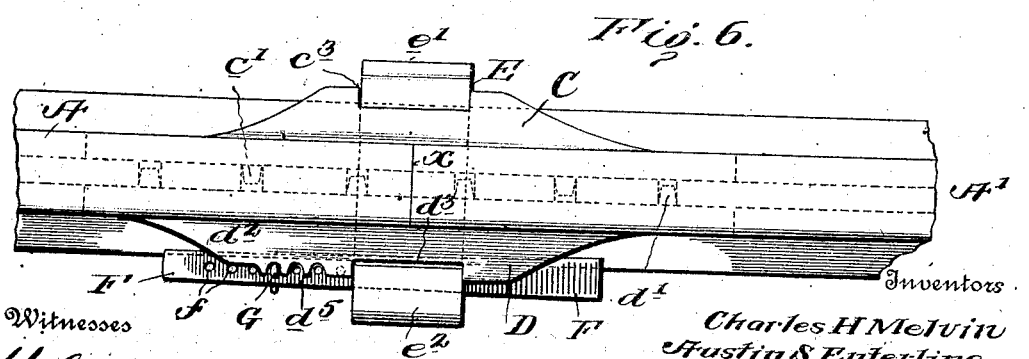

UNITED STATES PATENT OFFICE.

CHARLES H. MELVIN AND AUSTIN S. ENTERLINE, OF GREENVILLE, PENNSYLVANIA, ASSIGNORS OF ONE-THIRD TO JAMES G. DIMMICK, OF GREENVILLE, PENNSYLVANIA.

RAIL-JOINT.

1,059,189. Specification of Letters Patent. Patented Apr. 15, 1913.

Application filed October 17, 1912. Serial No. 726,195.

*To all whom it may concern:*

Be it known that we, CHARLES H. MELVIN and AUSTIN S. ENTERLINE, both citizens of the United States, residing at Greenville, in the county of Mercer and State of Pennsylvania, have invented certain new and useful Improvements in Rail-Joints, of which the following is a specification.

The object of this invention is to provide improved means for joining the adjacent ends of railway rails. Ordinarily this is done by means of fish plates arranged on opposite sides of the rails at the joints and secured to the rails by means of bolts carrying nuts. Despite the fact that numerous substitutes for this kind of fastening have been suggested it is, so far as we are aware, still the universal custom to join rails by fish plates and bolts in the manner above described although such fastenings are open to the objection that the nuts often work loose and much time is consumed in applying the nuts and bolts in the first instance and in tightening them from time to time.

According to our invention, we provide what we call boltless fish plates which are provided with studs entering openings in the webs of the rails and holding them securely in place, and we hold the fish plates to the rails by yokes which extend under the rails and engage the fish plates in such manner as to prevent them from slipping out of place, wedges being provided to lock the yokes and fish plates together. In this way we can join the adjacent ends of rails very quickly and the fastenings when once applied are strong and durable and, considering the saving of time, are comparatively inexpensive.

In the accompanying drawing:—Figure 1 is a perspective view of a rail joint embodying our improvements. Fig. 2 shows a transverse section thereof on the line 2—2 of Fig. 1. Fig. 3 is a perspective view of two abutting rails and two fish plates embodying our improvements, the fish plates being separated from the rails. Fig. 4 is a perspective view of the yoke employed for holding the fish plates in place. Fig. 5 is a perspective view of the wedge used for holding the yoke on the fish plates and also illustrates a cotter pin which may be employed for fastening the wedge. Fig. 6 shows a top plan view of the joint.

We have shown our improvements applied to rails A, A', of the usual kind. No change whatever is made in the rails which are formed with holes $a$ usually employed to receive bolts but which we use for another purpose. We employ two fish plates C and D, but these are of novel construction.

The plate C is formed with a body portion $c$ adapted to bridge the joint $x$ of the rails and to fit snugly between the head and foot flanges thereof. It carries studs $c'$ which enter registering holes $a$ in the webs of the rails and it is formed with an enlarged outer middle portion $c^2$ having a yoke-receiving recess $c^3$. The plate D, like the plate C, is formed with a body portion $d$ carrying studs $d'$ and having an enlarged middle portion $d^2$ formed with a yoke-receiving recess $d^3$. The middle portion $d^2$ is also formed with a horizontal wedge-receiving groove $d^4$ and with vertical key-receiving grooves $d^5$. When the plates are applied to the rails, the studs enter the holes $a$ and the rails are held in proper alinement.

In order to hold the plates on the rails we employ a yoke E, comprising a base $e$ and sides $e'$, $e^2$. The base is adapted to extend under the foot flanges of the rails while the sides are adapted to enter the recesses $c^3$ and $d^3$, and to embrace the fish plates. The opening E' between the sides of the yoke is slightly wider than the foot of the rail and one of the sides ($e'$) is formed contiguous to the upper face of the base with a horizontal groove $e^3$ to receive the adjacent foot flanges of the rails while the other side ($e^2$) is formed with a horizontal wedge-receiving groove $e^4$.

When the fish plates are applied to the rails in the manner above described, the yoke is placed under them and raised until the sides of the yoke enter and are seated in the recesses $c^3$ and $d^3$. At this time the foot flanges of the rails do not enter the groove $e^3$. If now the wedge F be inserted in the grooves $e^4$ and $d^4$ and driven home the parts will be moved sidewise until the foot flanges of the rails enter and are seated in the groove $e^3$.

The wedge F may be held in position by means of a cotter pin G extending through one of the grooves $d^5$ in the plate D and through one of the holes $f$ formed in the wedge.

The parts of the joint may be very quickly applied and locked and the joint is both secure and durable.

Our invention is shown applied to rails of standard design but the parts may be suitably modified to accommodate rails of different shapes.

We claim as our invention:

1. A rail joint, comprising a pair of fish plates engaging the rails, a yoke having a base on which the rails rest and upwardly projecting sides engaging the fish plates and one of which sides is formed on its inner side near the base with a groove for receiving the foot flanges of the rails, and means for locking one of the sides of the yoke to one of the fish plates and for forcing the foot flanges of the rails into said groove.

2. A rail joint, comprising a pair of fish plates provided with stud entering holes in the rails, a yoke extending under the rails having sides engaging the fish plates one of which is formed with a groove for receiving the foot flanges of the rails and the other of which is provided with a wedge-receiving groove, and a wedge entering said groove engaging the adjacent fish plate and forcing the foot flanges of the rails into said groove on the other side of the yoke.

3. A rail joint, comprising a pair of fish plates formed with studs entering openings in the webs of the rails and formed also with yoke-receiving recesses, a yoke extending below the rails and having sides entering the yoke-receiving recesses in the fish plates, one of which has a groove to receive the foot flanges of the rails, and the other a wedge-receiving groove, and a wedge entering the wedge-receiving groove of the yoke and engaging one of the fish plates.

4. A rail joint, comprising a pair of fish plates provided with studs entering openings in the rails each of which fish plates is formed with a yoke-receiving recess and one of which is formed with a wedge-receiving groove, a yoke extending under the rails and entering the yoke-receiving recesses in the fish plates and which is formed with a groove to receive the foot flanges of the rails and with a wedge-receiving groove, a wedge extending into the wedge-receiving grooves of the fish plate and yoke, and devices for holding the wedge in place.

In testimony whereof, we have hereunto subscribed our names.

CHARLES H. MELVIN.
AUSTIN S. ENTERLINE.

Witnesses:
SAMUEL J. ORR,
FLORENCE BEAVER.